(12) United States Patent
Yebka et al.

(10) Patent No.: US 9,017,848 B2
(45) Date of Patent: Apr. 28, 2015

(54) MINIMIZING AND STABILIZING CELL TEMPERATURE GRADIENT IN A BATTERY PACK

(75) Inventors: Bouziane Yebka, Apex, NC (US); Joseph Anthony Holung, Wake Forest, NC (US); Tin-Lup Wong, Chapel Hill, NC (US)

(73) Assignee: Lenova (Singapore) Pte. Ltd., Singapore (SG)

( * ) Notice: Subject to any disclaimer, the term of this patent is extended or adjusted under 35 U.S.C. 154(b) by 699 days.

(21) Appl. No.: 13/005,400

(22) Filed: Jan. 12, 2011

(65) Prior Publication Data
US 2012/0177968 A1 Jul. 12, 2012

(51) Int. Cl.
| | | |
|---|---|---|
| H01M 10/50 | (2006.01) |
| H01M 10/617 | (2014.01) |
| H01M 10/42 | (2006.01) |
| H01M 10/48 | (2006.01) |
| H01M 10/625 | (2014.01) |
| H01M 10/633 | (2014.01) |
| H01M 10/6554 | (2014.01) |
| H01M 10/6561 | (2014.01) |
| H01M 10/6563 | (2014.01) |
| H01M 10/6567 | (2014.01) |
| H01M 10/658 | (2014.01) |
| H01M 10/643 | (2014.01) |
| H01M 10/6555 | (2014.01) |

(52) U.S. Cl.
CPC ...... *H01M 10/5008* (2013.01); *Y10T 29/49826* (2015.01); *H01M 10/4207* (2013.01); *H01M 10/425* (2013.01); *H01M 10/482* (2013.01); *H01M 10/486* (2013.01); *H01M 10/5016* (2013.01); *H01M 10/5022* (2013.01); *H01M 10/503* (2013.01); *H01M 10/5053* (2013.01); *H01M 10/5055* (2013.01); *H01M 10/5063* (2013.01); *H01M 10/5067* (2013.01); *H01M 10/5075* (2013.01); *H01M 10/5087* (2013.01)

(58) Field of Classification Search
USPC .......... 429/120, 7, 149, 61–62, 82; 29/623.1, 29/428
See application file for complete search history.

(56) References Cited

U.S. PATENT DOCUMENTS

| | | | | |
|---|---|---|---|---|
| 3,843,410 | A * | 10/1974 | Spahrbier | 429/416 |
| 6,123,266 | A * | 9/2000 | Bainbridge et al. | 236/49.3 |
| 6,936,372 | B1 * | 8/2005 | Jagota et al. | 429/50 |
| 2005/0064280 | A1 * | 3/2005 | Watanabe et al. | 429/120 |
| 2007/0035928 | A1 * | 2/2007 | Hamman | 361/701 |
| 2010/0061061 | A1 * | 3/2010 | Murata | 361/699 |
| 2010/0291419 | A1 * | 11/2010 | Zhou | 429/50 |
| 2012/0164508 | A1 * | 6/2012 | Houchin-Miller et al. | 429/120 |
| 2012/0206096 | A1 * | 8/2012 | John | 320/108 |

FOREIGN PATENT DOCUMENTS

WO    WO 2009/005030    *    1/2009 ............ H01M 10/50

* cited by examiner

*Primary Examiner* — Raymond Alejandro
(74) *Attorney, Agent, or Firm* — John L. Rogitz; John M. Rogitz

(57) ABSTRACT

A system includes a first battery cell, a second battery cell, and thermally conductive material that couples to the battery cells. In turn, the thermally conductive material dissipates heat between the first battery cell and the second battery cell, thus reducing a temperature differential between the first battery cell and the second battery cell.

14 Claims, 10 Drawing Sheets ized to provide particular voltage/current values as the battery pack's output. When a battery pack charges or discharges, each battery cell individually charges or discharges at a particular rate until the battery pack fully charges or fully discharges.

MINIMIZING AND STABILIZING CELL TEMPERATURE GRADIENT IN A BATTERY PACK

TECHNICAL FIELD

Subject matter disclosed herein relates to a minimizing and stabilizing temperature gradient in a battery pack, and more particularly relates to minimizing temperature differentials between battery cells that are included in a battery pack.

BACKGROUND

Battery packs are used extensively in notebook computers, cell phones, tools, transportation vehicles (e.g., electric cars, trains, buses, etc.), and other systems that depend upon an electrical source to function. Battery packs typically include multiple battery cells (e.g., lithium-ion battery cells) that are electrically coupled within the battery pack in order to provide particular voltage/current values as the battery pack's output. When a battery pack charges or discharges, each battery cell individually charges or discharges at a particular rate until the battery pack fully charges or fully discharges.

SUMMARY

A system includes a first battery cell, a second battery cell, and thermally conductive material that couples to the battery cells. In turn, the thermally conductive material dissipates heat between the first battery cell and the second battery cell, thus reducing a temperature differential between the first battery cell and the second battery cell.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
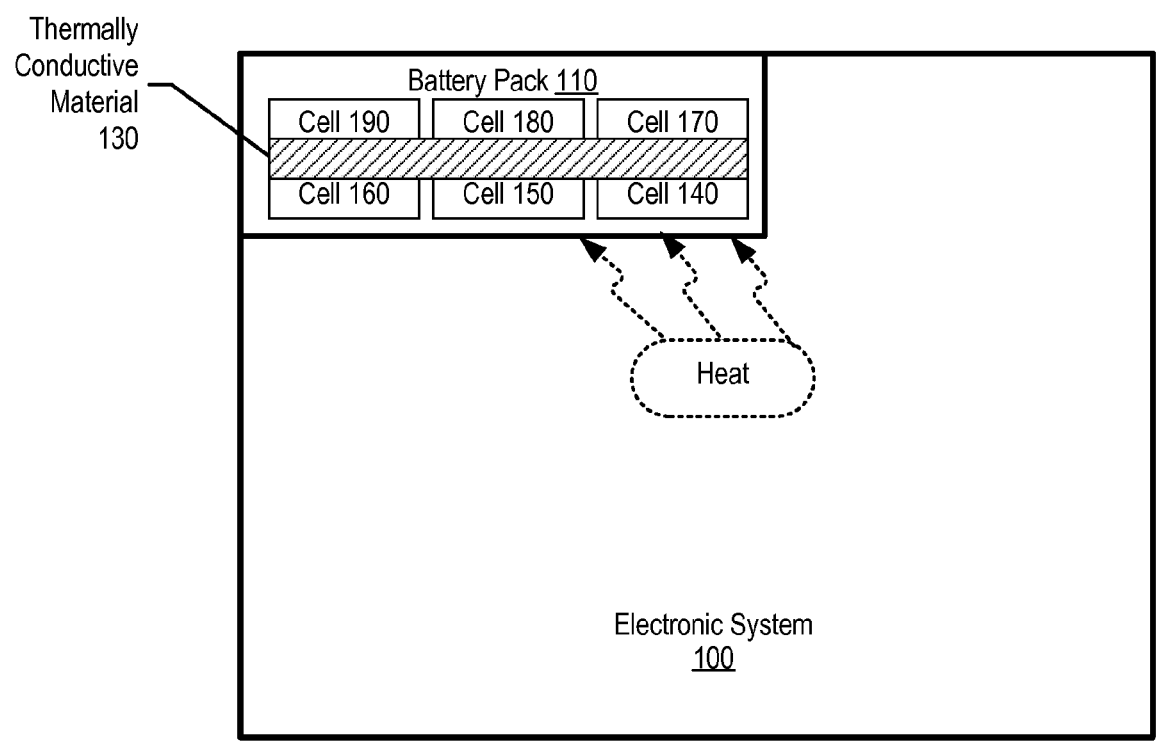
FIG. 1 is a diagram showing a battery pack that includes thermally conductive material coupled to multiple battery cells included in the battery pack.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a battery pack that includes thermally conductive material coupled to multiple battery cells included in the battery pack. As discussed in further detail below, a significant factor that affects a battery pack's performance and lifecycle is temperature differentials between battery cells included in the battery pack. When a battery pack charges or discharges, each of the battery cells may produce a different amount of heat (from internal chemical reactions), thus causing temperature differentials between the battery cells.

In addition, depending upon the system for which the battery pack provides the electrical source, the system itself may produce heat that, in turn, may cause one of the battery cells to be at a different temperature than another battery cell. As discussed herein, battery pack performance and lifecycle are improved by minimizing temperature differentials between battery cells included in the battery pack.

Battery pack 110 includes cells 140-190 and thermally conductive material 130. Thermally conductive material 130 couples to cells 140-190 and distributes heat between the different cells (see FIG. 2A and corresponding text for further details). In one embodiment, temperature differentials between cells 140-190 may be attributed to different cells generating different amounts of heat during charging/discharging cycles (e.g., cells closer to the charging/discharging source may produce more heat). In this embodiment, thermally conductive material 130 distributes heat from a "hotter" battery cell to a "cooler" battery cell, thus minimizing temperature differentials between battery cells.

In another embodiment, electronic system 100 may generate heat (e.g., from a processor) that, in turn, dissipates to a concentrated area of battery pack 110. The example shown in FIG. 1 shows that cell 140 may be most susceptible to heat generated by electronic system 100. In this example, thermally conductive material 130 dissipates heat from cell 140 to cells 150-190, thus minimizing the temperature differential between cells 140-190.

Thermally conductive material 130 may be for example, thermal tape, thermal epoxy, or any other material to dissipate heat. As those skilled in the art can appreciate, thermally conductive material 130 may couple to each of cells 140-190 at one or more areas. For example, thermally conductive material 140-190 may reside on top of cells 140-190, and/or reside between cells 140-190 (see FIGS. 4A-4E and corresponding text for further details).

Figure 2A:
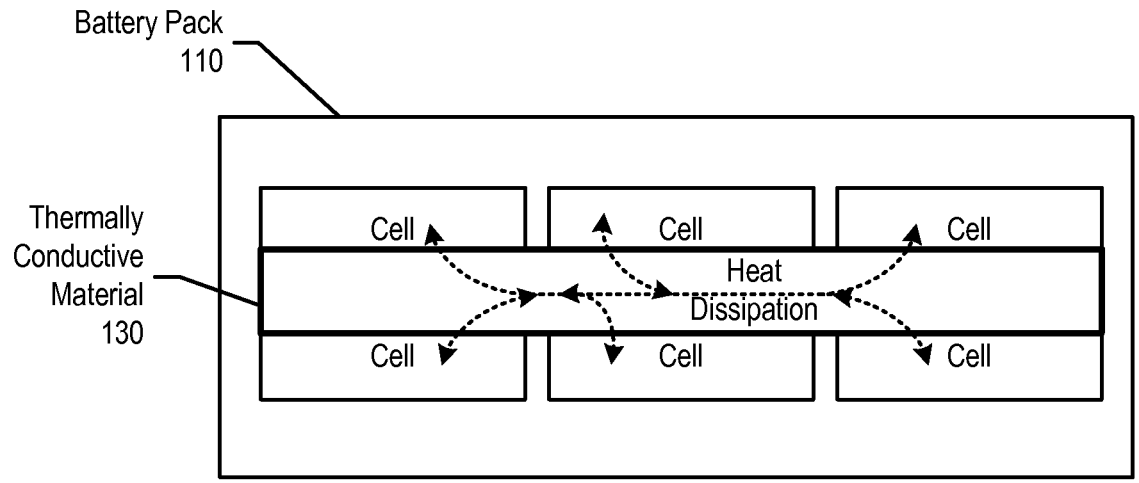
FIG. 2A is a diagram showing thermally conductive material dissipating heat between battery cells.

FIG. 2A is a diagram showing thermally conductive material dissipating heat between battery cells. As can be seen, heat dissipates between battery cells through thermally conductive material 130, thus minimizing temperature differentials between the battery cells during charging/discharging operations (see FIG. 3 and corresponding text for further details).

Figure 2B:
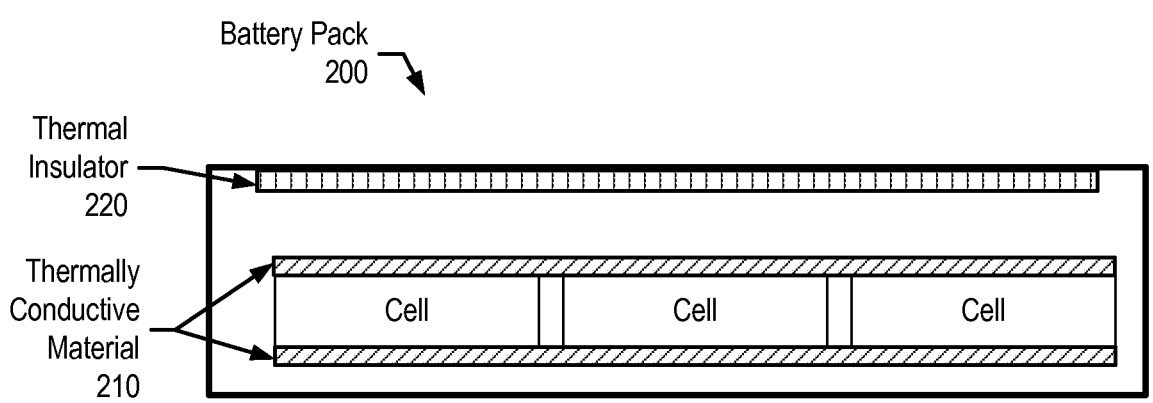
FIG. 2B is a diagram showing a battery pack that includes thermally conductive material coupled to battery cells and a thermal insulator to minimize heat dissipating to/from external areas of the battery pack.

FIG. 2B is a diagram showing a battery pack that includes thermally conductive material coupled to battery cells and a thermal insulator to minimize heat dissipating to/from external areas of the battery pack. Battery pack 200 includes thermally conductive material 210 that couples "on top" and "on bottom" of three battery cells to dissipate heat between the cells. In addition, battery pack 220 includes thermal insulator 220. In one embodiment, thermal insulator 220 minimizes external heat from entering battery pack 200 (e.g., from a laptop computer) and provoking temperature differentials between the battery cells. In another embodiment, thermal insulator 220 prevents heat generated internal to battery pack 200 to escape, thus reducing battery pack 200's surface temperature.

Figure 3:
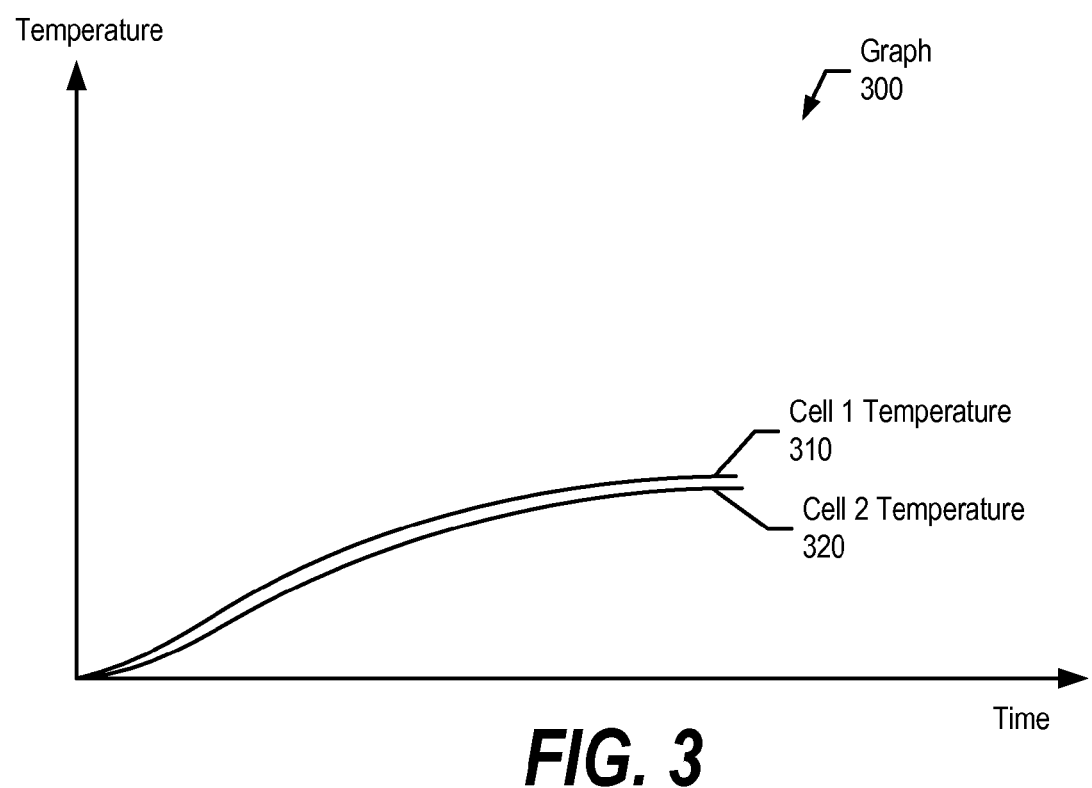
FIG. 3 is a diagram showing a graphical representation of a temperature differential between two battery cells that are coupled through thermally conductive material.

FIG. 3 is a diagram showing a graphical representation of a temperature differential between two battery cells that are coupled through thermally conductive material. Graph 300 shows two battery cell temperatures (cell 1 temperature 310 and cell 2 temperature 320) steadily increasing over time due to the battery cells charging or discharging. As can be seen, by having thermally conductive material coupled to both cells, their cell temperatures track one another and minimize the temperature differential between the cells.

Figure 4A:
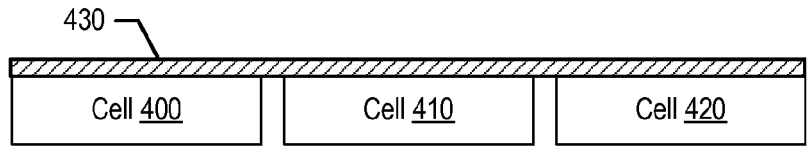
FIGS. 4A-E are diagrams showing various embodiments of thermally conductive materials coupled to multiple battery cells.
Figure 4B:
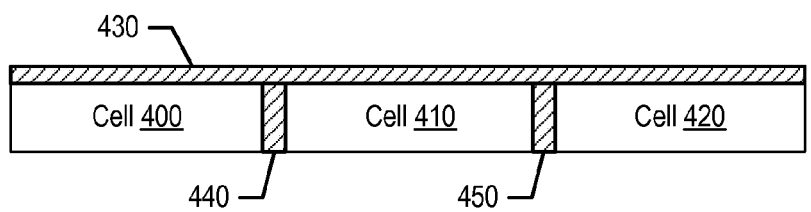
Figure 4C:
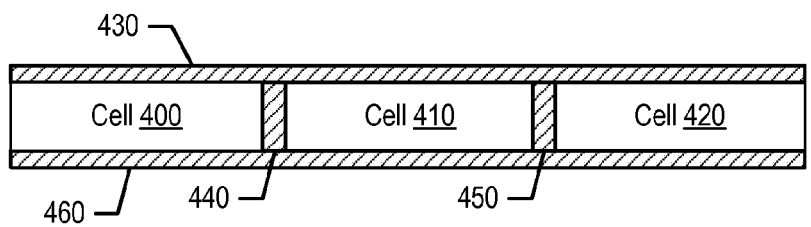
Figure 4D:
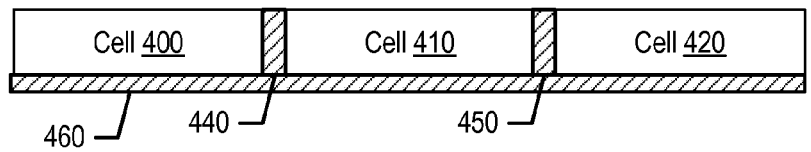
Figure 4E:
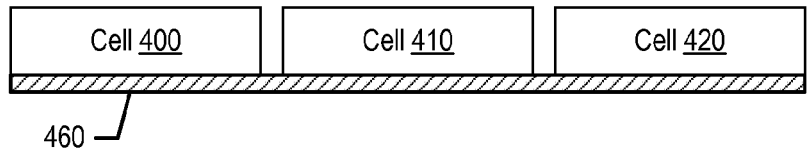

FIGS. 4A-E are diagrams showing various embodiments of thermally conductive materials 430-460 coupled to battery cells 400-420. FIG. 4A shows thermally conductive material 430 coupled to the "top" portion of cells 400-420. FIG. 4B shows the addition of thermally conductive materials 440 and 450 coupled between cells 400-420. FIG. 4C shows the addition of thermally conductive material 460 coupled to the "bottom" of cells 400-420. FIG. 4D shows thermally conductive material 440-460 coupled to cells 400-420, and FIG. 4E shows thermally conductive material 460 coupled to cells 400-420. As those skilled in the art can appreciate, one may select a particular embodiment, or a different embodiment altogether, based upon a battery pack's characteristics (form factor, thermal considerations, etc) in order to minimize temperature differentials between battery cells. In one embodiment, a system may individually increase/decrease the temperature of a particular battery cell in order to reach the same temperature as an adjoining battery cell (see FIG. 8 and corresponding text for further details).

Figure 5A:
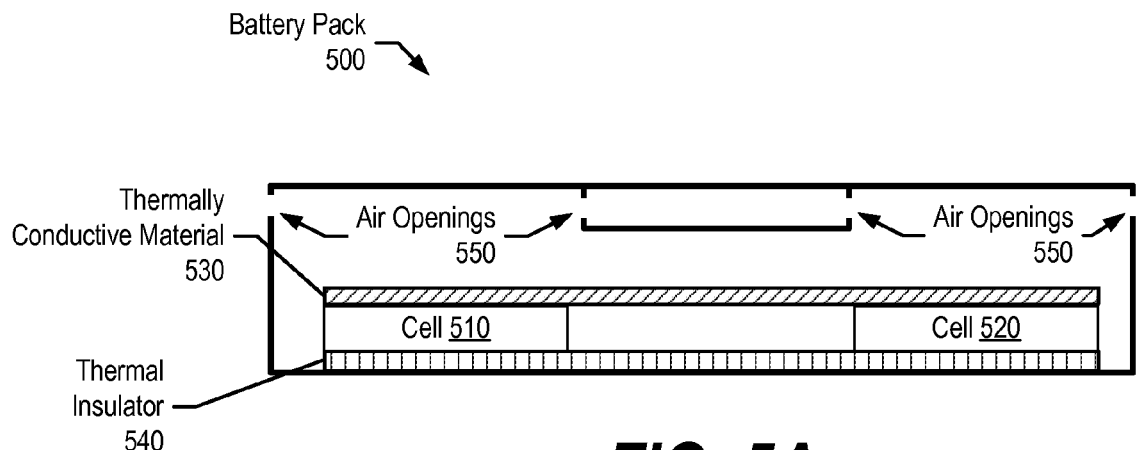
FIG. 5A-B is a diagram showing a battery pack that includes thermally conductive material, a thermal insulator, and openings for air circulation.
Figure 5B:
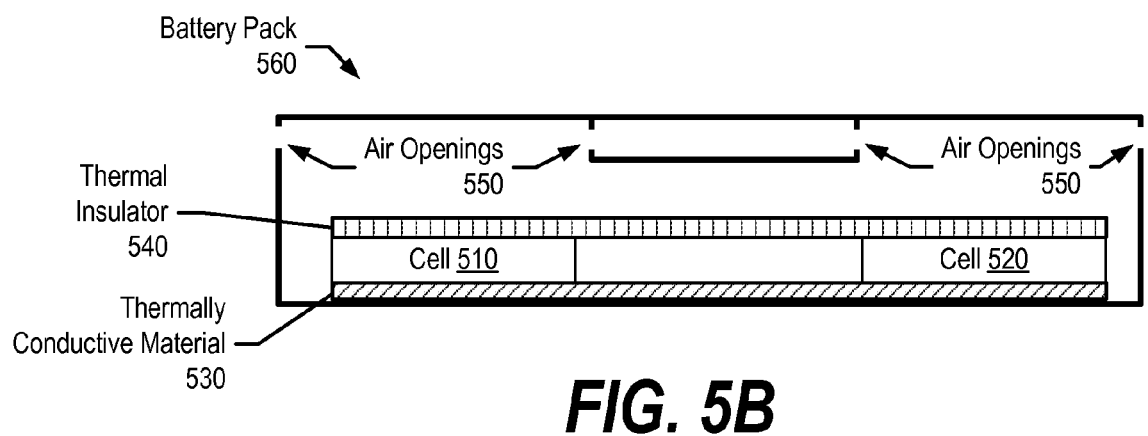

FIG. 5A-B is a diagram showing a battery pack that includes thermally conductive material, a thermal insulator, and openings for air circulation. FIG. 5A shows battery pack 500, which includes cells 510-520, thermally conductive material 530, and thermal insulator 540. Thermally conductive material 530 dissipates heat between cells 510 and 520. Thermal insulator 540 insulates cells 510 and 520 from heat that is external to battery pack 500. As discussed earlier, thermal insulator 540 also minimizes heat escape from battery pack 500 that cells 510 and 520 generate from charging and discharging.

Battery pack 500 also includes air openings 550, which allow air to circulate over thermally conductive material 530, thereby further dissipating heat between cells 510 and 520.

FIG. 5B shows battery pack 560, which is similar to battery pack 500 with the exception that thermal insulator 540 and thermally conductive material 530 are in opposite locations. In this embodiment, battery pack 560 may be used to minimize heat dissipation above battery pack 560. For example, battery pack 560 may be utilized in a laptop application to minimize heat dissipation to the laptop's keyboard.

Figure 5C:
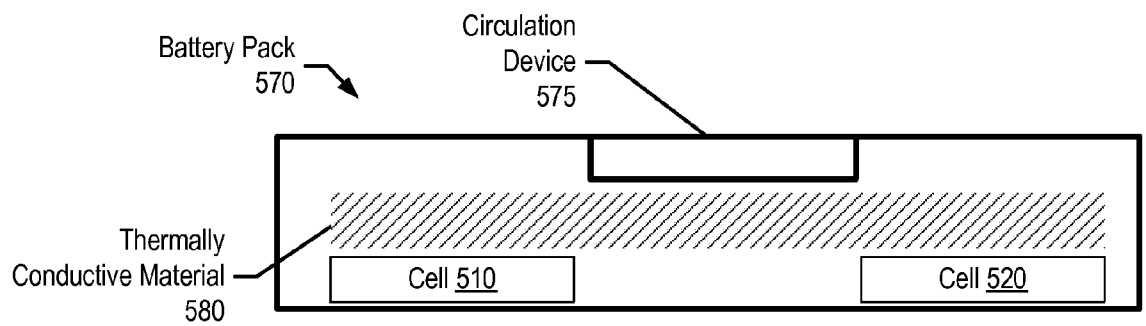
FIG. 5C is a diagram showing a battery pack with a circulation device.

FIG. 5C shows battery pack 570, which includes circulation device 575. In this embodiment, circulation device 575 (e.g., a fan or pump) circulates thermally conductive material 580 between cell 510 and 520 to homogenize their cell temperatures. In this embodiment, thermally conductive material 580 may be a gas (e.g., air) or a liquid material. In another embodiment, battery pack 570 is devoid of a heat exchanger to dissipate heat external to battery pack 570. Rather, in this embodiment, circulation device 575 circulates thermally conductive material 580 to reduce the temperature differential between cell 510 and cell 520.

Figure 6:
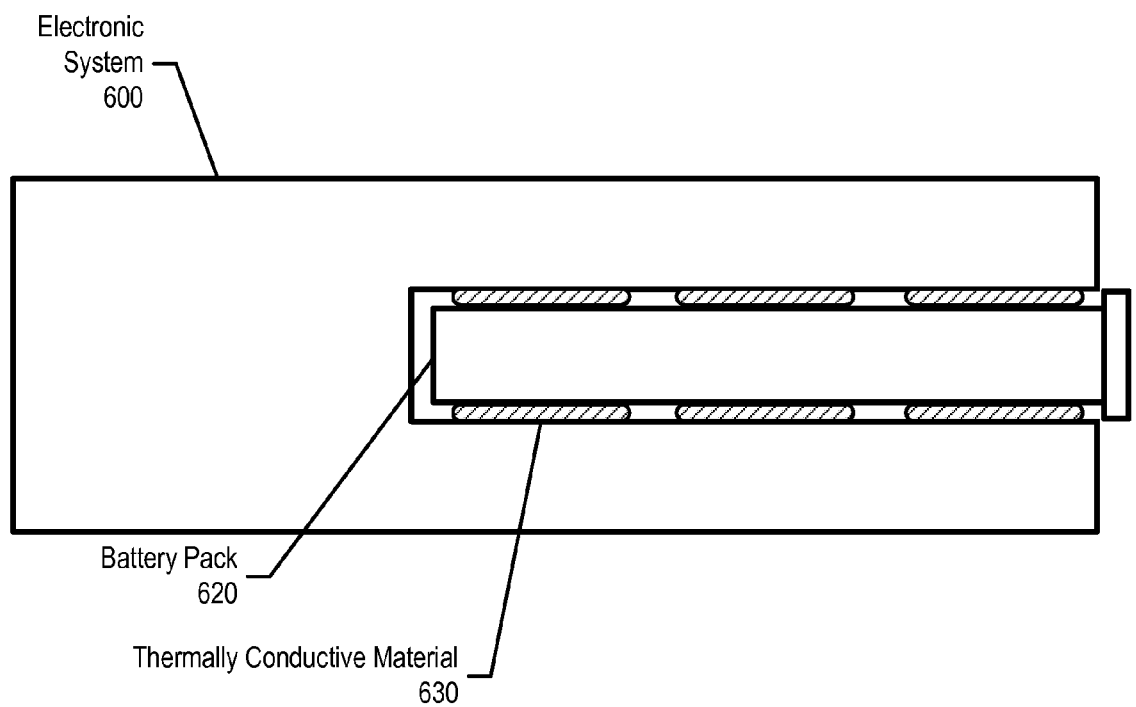
FIG. 6 is a diagram showing thermally conductive material positioned between an electronic system and a battery that evenly dissipates heat within and/or around the battery pack.

FIG. 6 is a diagram showing thermally conductive material positioned between an electronic system and a battery pack in order to evenly dissipate heat within and/or around the battery pack. Electronic system 600, such as a laptop computer, includes a battery cavity area to insert battery pack 620. FIG. 6 shows thermally conductive material 630 between electronic system 600 and battery pack 620 to distribute heat generated by electronic system 600 and/or battery pack 620. In turn, battery cells internal to battery pack 620 are exposed to even temperatures surrounding battery back 620.

In one embodiment, thermally conductive material 630 affixes to electronic system 600, and couples to battery pack 620 when a user inserts battery pack 620 into electronic system 600's battery cavity. In another embodiment, thermally conductive material 630 affixes to battery pack 620, and couples to electronic system 600's battery cavity when a user inserts battery pack 620 into electronic system 600's battery cavity.

Figure 7A:
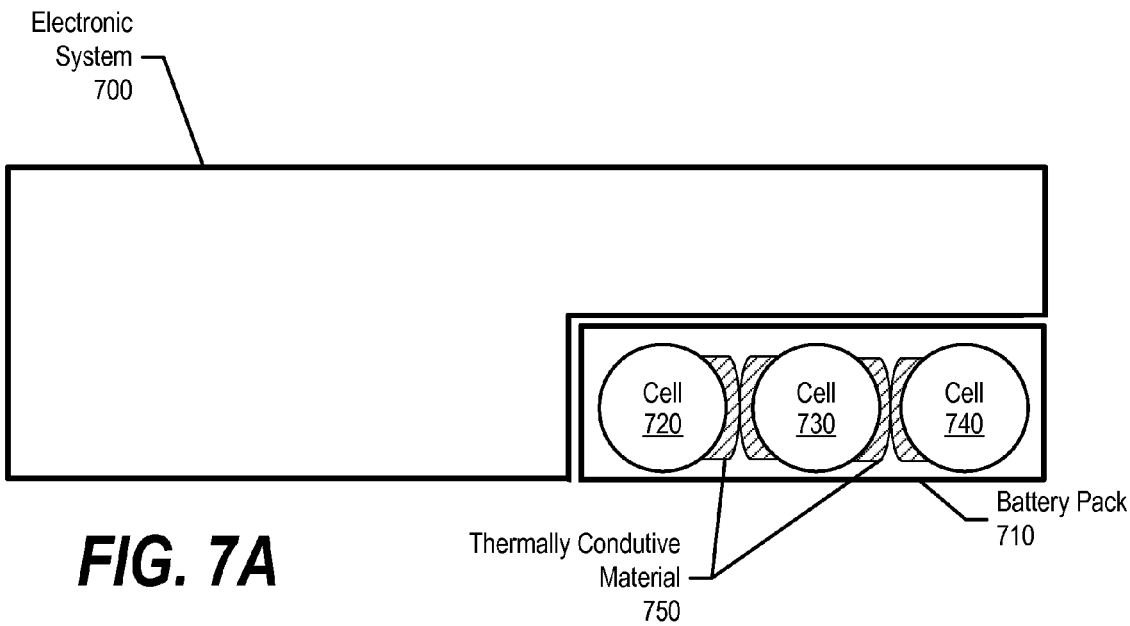
FIG. 7A-B are diagrams showing various embodiments of a battery pack that includes thermally conductive material coupled to battery cells.
Figure 7B:
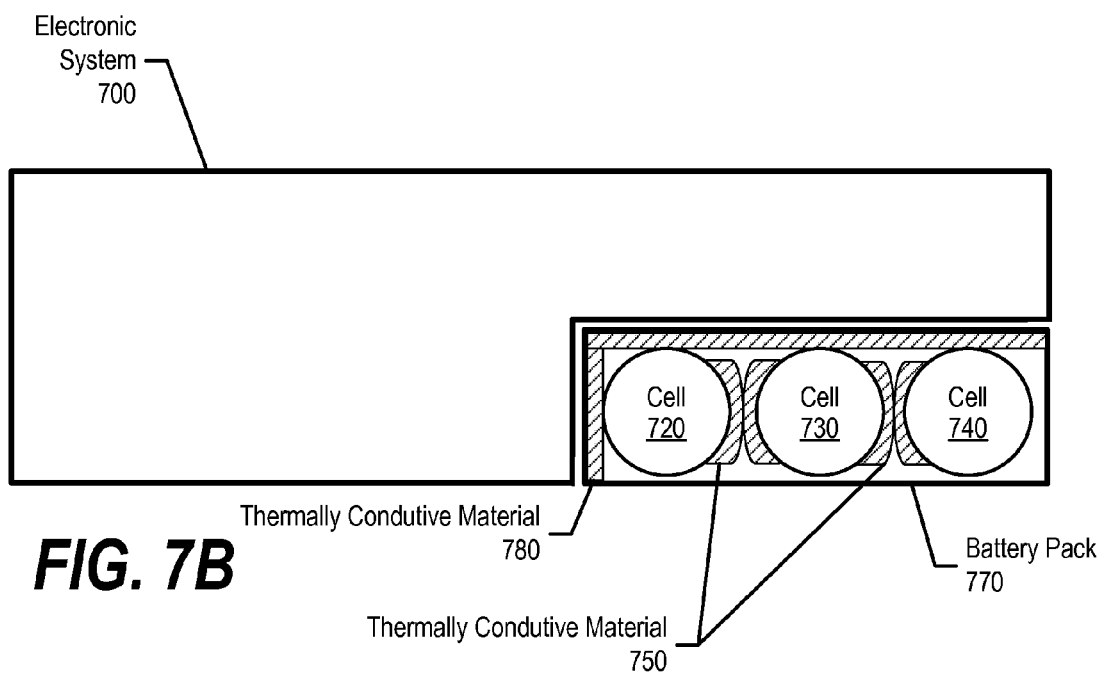

FIG. 7A-B are diagrams showing various embodiments of a battery pack that includes thermally conductive material coupled to battery cells. FIG. 7A shows a "cross section" of electronic system 700 and battery pack 710. As can be seen, battery pack 710 includes battery cells 720-740 and thermally conductive material 750 coupled between battery cells 720-740. As discussed herein, thermally conductive material dissipates heat between cells 720-740, thus reducing the temperature differentials between the battery cells.

FIG. 7B is similar to FIG. 7A with the exception that battery pack 770 includes thermally conductive material 780 in addition to thermally conductive material 750. Thermally conductive material 780 provides an additional mechanism to transfer heat between cells 720-740, regardless of whether the heat generates from electronic system 700 and/or one or more of cells 720-740. Furthermore, thermally conductive material 780 may dissipate heat evenly over battery pack 770 that is generated from a "hotspot" included in electronic system 700 (e.g., a processor).

Figure 8:
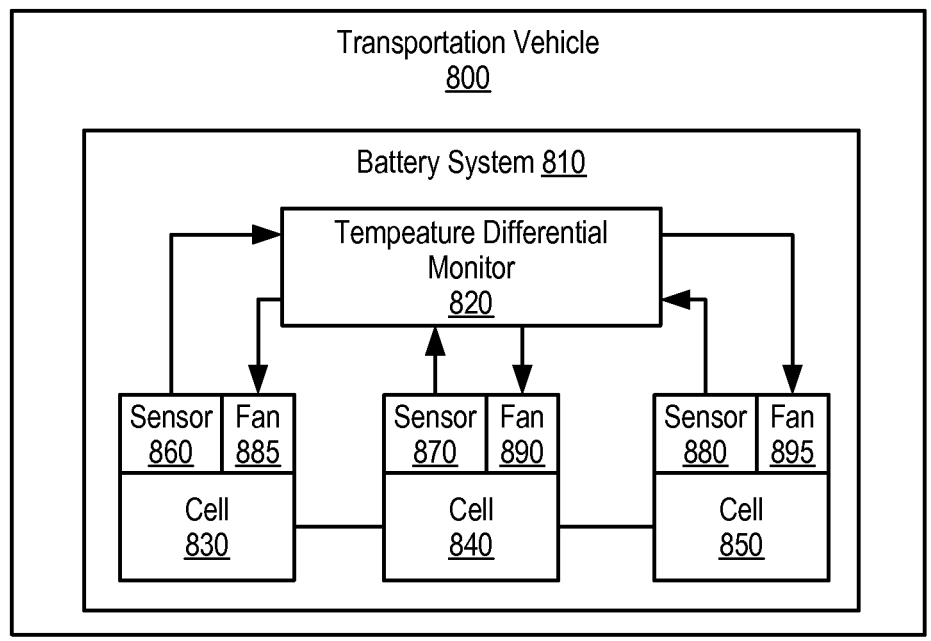
FIG. 8 is a diagram showing a battery system controlling individual battery cell temperatures that minimize temperature differences between the battery cells.

FIG. 8 is a diagram showing a battery system controlling individual battery cell temperatures in order to minimize temperature differences between the battery cells. Transportation vehicle 800 utilizes battery system 810, which includes capabilities to minimize temperature differentials between battery cells 830-850. Transportation vehicle 830 may be, for example, an electric car, an electric bus, a commuter rail system with backup power capability, and etcetera. Battery system 810 includes temperature differential monitor 820, which monitors individual temperatures of cells 830-850 via sensors 860-880, respectively. When temperature differentials between battery cells 830-850 exceed a threshold, temperature differential monitor 820 activates one or more of fans 885-895 in order to bring one or more of cells 830-850 to an acceptable temperature range (see FIG. 9 and corresponding text for further details).

Figure 9:
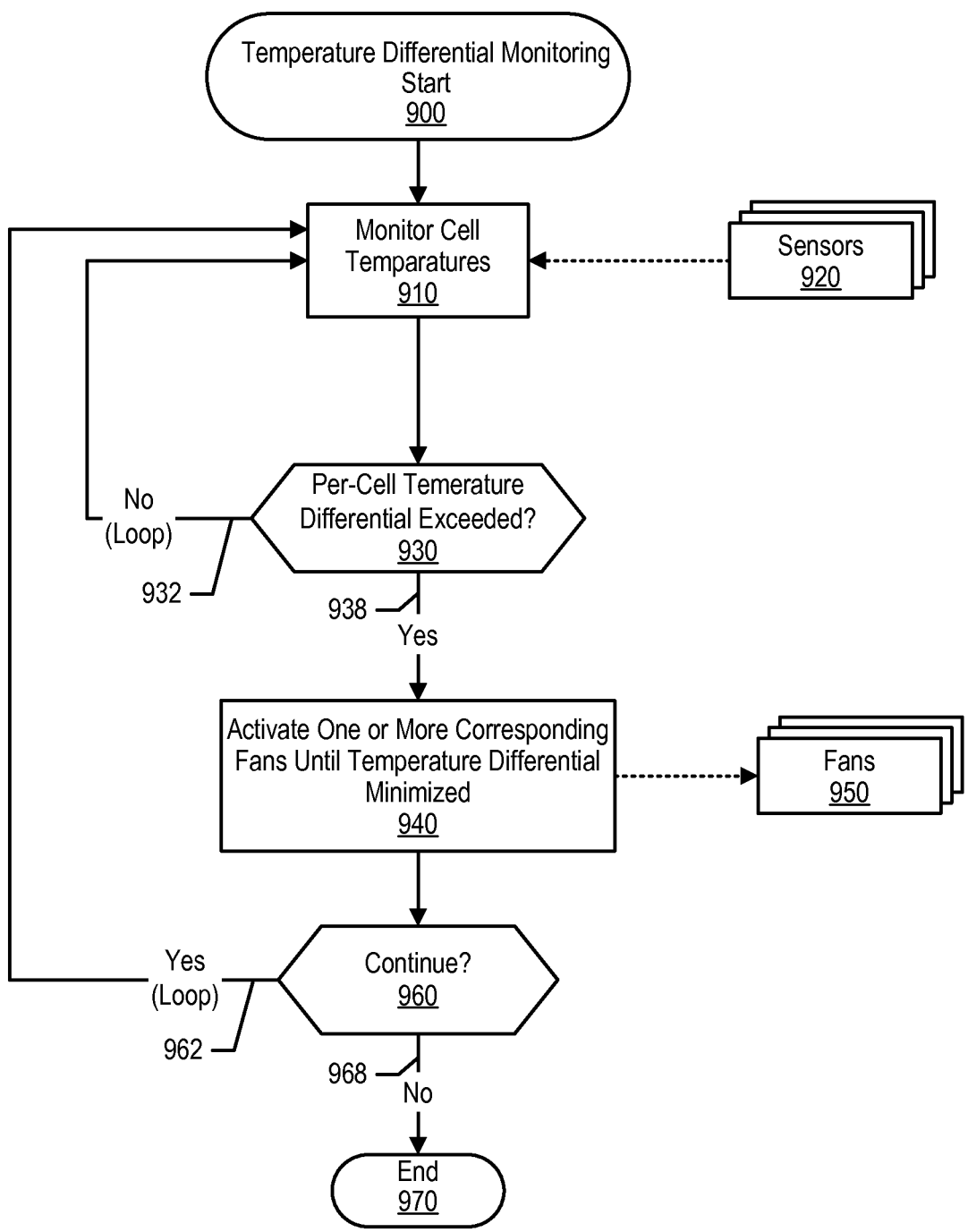
FIG. 9 is a flowchart showing steps taken in a temperature differential monitoring system monitoring and controlling different battery cell temperatures.

FIG. 9 is a flowchart showing steps taken in a temperature differential monitoring system monitoring and controlling different battery cell temperatures. Processing commences at 900, whereupon processing monitors individual battery cell temperatures using sensors 920. A determination is made whether one or more temperature differentials between the battery cells exceed a threshold (decision 930). If the temperature differentials do not exceed a threshold, decision 930 branches to "No" branch 932, whereupon processing loops back to continue monitoring battery cell temperature. This looping continues until one or more of the temperature differentials exceeds the threshold, at which point decision 930 branches to "Yes" branch 938.

At step 940, the temperature differential monitor activates one or more fans 950 to reduce the temperature differential between the battery cells. Referring to FIG. 8, if the temperature differential between cell 840 and 850 exceeds a threshold, but the temperature differential between cell 830 and 840 is below the threshold, processing may activate fan 895 in order to reduce the temperature of cell 850. In another example, if the temperature differential between cells 840 and 850 exceeds a threshold, and the temperature differential between cells 830 and 840 also exceeds the threshold, processing may activate fan 890 in order to reduce the temperature of cell 840.

Once the temperature differentials are within acceptable limits, a determination is made as to whether to continue monitoring battery cell temperatures (e.g., vehicle turned off). If the temperature differential monitor should continue to monitor battery cell temperatures, decision 960 branches to "Yes" branch 962, which loops back to continue monitoring battery cell temperatures. This looping continues until processing should stop monitoring battery cell temperature, at which point decision 960 branches to "No" branch 968 whereupon processing ends at 970.

Figure 10:
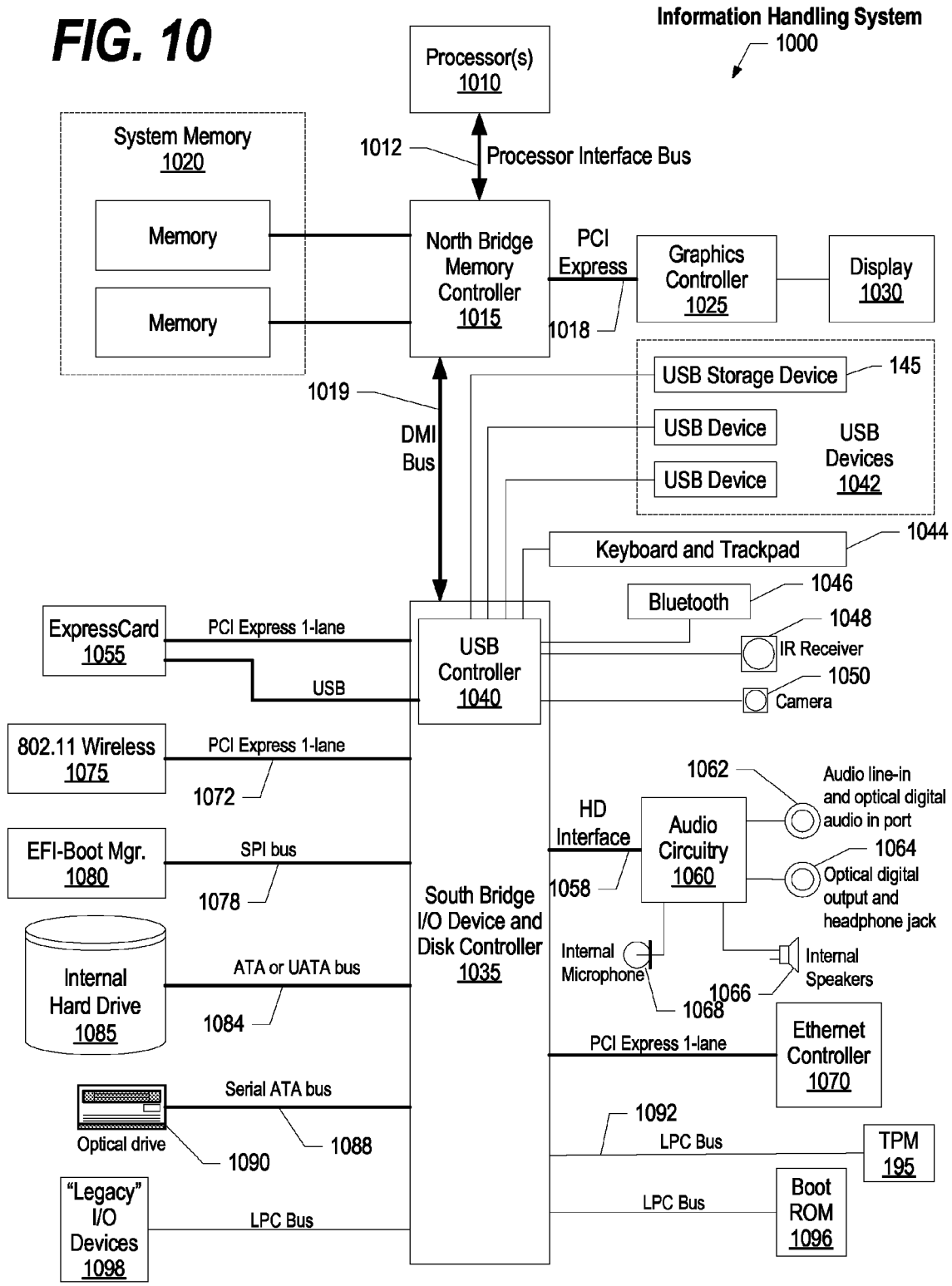
FIG. 10 is a block diagram example of a data processing system in which the methods described herein can be implemented.

FIG. 10 illustrates information handling system 1000, which is a simplified example of a computer system capable of performing the computing operations described herein. Information handling system 1000 includes one or more processors 1010 coupled to processor interface bus 1012. Processor interface bus 1012 connects processors 1010 to Northbridge 1015, which is also known as the Memory Controller Hub (MCH). Northbridge 1015 connects to system memory 1020 and provides a means for processor(s) 1010 to access the system memory. Graphics controller 1025 also connects to Northbridge 1015. In one embodiment, PCI Express bus 1018 connects Northbridge 1015 to graphics controller 1025. Graphics controller 1025 connects to display device 1030, such as a computer monitor.

Northbridge 1015 and Southbridge 1035 connect to each other using bus 1019. In one embodiment, the bus is a Direct Media Interface (DMI) bus that transfers data at high speeds in each direction between Northbridge 1015 and Southbridge 1035. In another embodiment, a Peripheral Component Interconnect (PCI) bus connects the Northbridge and the Southbridge. Southbridge 1035, also known as the I/O Controller Hub (ICH) is a chip that generally implements capabilities that operate at slower speeds than the capabilities provided by the Northbridge. Southbridge 1035 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also connects Southbridge 1035 to Trusted Platform Module (TPM) 1095. Other components often included in Southbridge 1035 include a Direct Memory Access (DMA) controller, a Programmable Interrupt Controller (PIC), and a storage device controller, which connects Southbridge 1035 to nonvolatile storage device 1085, such as a hard disk drive, using bus 1084.

ExpressCard 1055 is a slot that connects hot-pluggable devices to the information handling system. ExpressCard 1055 supports both PCI Express and USB connectivity as it connects to Southbridge 1035 using both the Universal Serial Bus (USB) the PCI Express bus. Southbridge 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 connects to Southbridge 1035 via the PCI or PCI Express bus 1072. LAN device 1075 typically implements one of the IEEE 802.11 standards of over-the-air modulation techniques that all use the same protocol to wirelessly communicate between information handling system 1000 and another computer system or device. Optical storage device 1090 connects to Southbridge 1035 using Serial ATA (SATA) bus 1088. Serial ATA adapters and devices communicate over a high-speed serial link. The Serial ATA bus also connects Southbridge 1035 to other forms of storage devices, such as hard disk drives. Audio circuitry 1060, such as a sound card, connects to Southbridge 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to Southbridge 1035 using a bus, such as the PCI or PCI Express bus. Ethernet controller 1070 connects information handling system 1000 to a computer network, such as a Local Area Network (LAN), the Internet, and other public and private computer networks.

While FIG. 10 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A system comprising:
    a plurality of battery cells, the plurality of battery cells including a first battery cell and a second battery cell;
    a thermally conductive material, wherein the thermally conductive material is configured to dissipate heat between the first battery cell and the second battery cell;
    at least one circulation device, wherein the circulation device is configured to circulate the thermally conductive material between the first battery cell and the second battery cell;
    a temperature monitor; and
    plural temperature sensors configured to respectively communicate with the temperature monitor and to respectively provide input thereto, each of the plural temperature sensors configured to sense a respective temperature at least near at least one of the plurality of battery cells with which a respective temperature sensor is juxtaposed at least adjacent to in order to provide input to the temperature monitor regarding the respective temperature, wherein the temperature monitor receives respective input from each of the plural temperature sensors to determine whether at least one temperature in the system has exceeded at least one temperature threshold, the at least one temperature being sensed by at least one of the plural temperature sensors and input to the temperature monitor, and wherein the temperature monitor actuates the at least one circulation device to reduce the at least one temperature in response to a determination that the at least one temperature exceeds the at least one temperature threshold.

2. The system of claim 1 wherein the thermally conductive material is a liquid material.

3. The system of claim 1, wherein the at least one circulation device is a fan.

4. The system of claim 2, wherein the at least one circulation device is a pump.

5. The system of claim 1, wherein the temperature monitor determines whether the at least one temperature has been reduced, and determines whether to continue determining whether at least one temperature in the system exceeds at least one temperature threshold subsequent to a temperature reduction of the at least one temperature.

6. The system of claim 1, comprising plural circulation devices each associated with a respective battery cell of the plurality of battery cells, wherein a respective temperature sensed by a respective temperature sensor is reduced by activating one of the circulation devices associated with the respective battery cell.

7. The system of claim 6, wherein each circulation device is a fan juxtaposed adjacent to a respective battery cell.

8. The system of claim 1, wherein the temperature monitor determines whether at least one temperature in the system has exceeded at least one temperature threshold at least partially based on a temperature differential identified by the temperature monitor, the temperature differential identified by the temperature monitor based on input received from at least one of the plural temperature sensors.

9. The system of claim 1, wherein the temperature monitor actuates the at least one circulation device to increase at least a first temperature of a first battery cell of the plurality of battery cells in response to a determination by the temperature monitor that the first temperature is below at least one temperature threshold.

10. The system of claim 1, wherein the temperature monitor actuates the at least one circulation device to increase at least a first temperature of a first battery cell of the plurality of battery cells in response to a determination that the first temperature is below at least one temperature threshold.

11. A system comprising:
    a plurality of battery cells that are configured to provide power to one or more components, the plurality of battery cells comprising a first battery cell and a second battery cell;
    at least one thermally conductive material, the thermally conductive material configured to dissipate heat from the first battery cell by directing the heat to the second battery cell;
    at least one circulation device, wherein the circulation device is configured to circulate the thermally conductive material between the first battery cell and the second battery cell;
    at least one aperture through which air from outside the system travels, the aperture configured to permit air to travel from outside the system to thermally engage with the thermally conductive material to exchange heat therewith, the thermally conductive material being a material other than air;
    a temperature monitor; and
    plural temperature sensors configured to respectively communicate with the temperature monitor and to respectively provide input thereto, each of the plural temperature sensors configured to sense a respective temperature at least near at least one of the plurality of battery cells with which a respective temperature sensor is juxtaposed at least adjacent to in order to provide input to the temperature monitor regarding the respective temperature, wherein the temperature monitor receives respective input from each of the plural temperature sensors to determine whether at least one temperature in the system has exceeded at least one temperature threshold, the at least one temperature being sensed by at least one of the plural temperature sensors and input to the temperature monitor, and wherein the temperature monitor actuates the at least one circulation device to reduce the at least one temperature in response to a determination that the at least one temperature exceeds the at least one temperature threshold.

12. The system of claim 11, wherein the thermally conductive material is a liquid material.

13. The system of claim 11, comprising a device to be powered.

14. The system of claim 11, wherein the system actuates the at least one circulation device to increase at least a first temperature of a first battery cell of the plurality of battery cells in response to a determination that the first temperature is below at least one temperature threshold.

* * * * *